Figure 9:
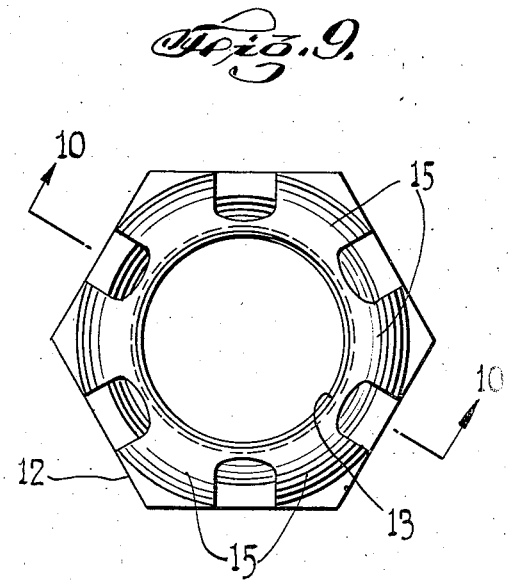

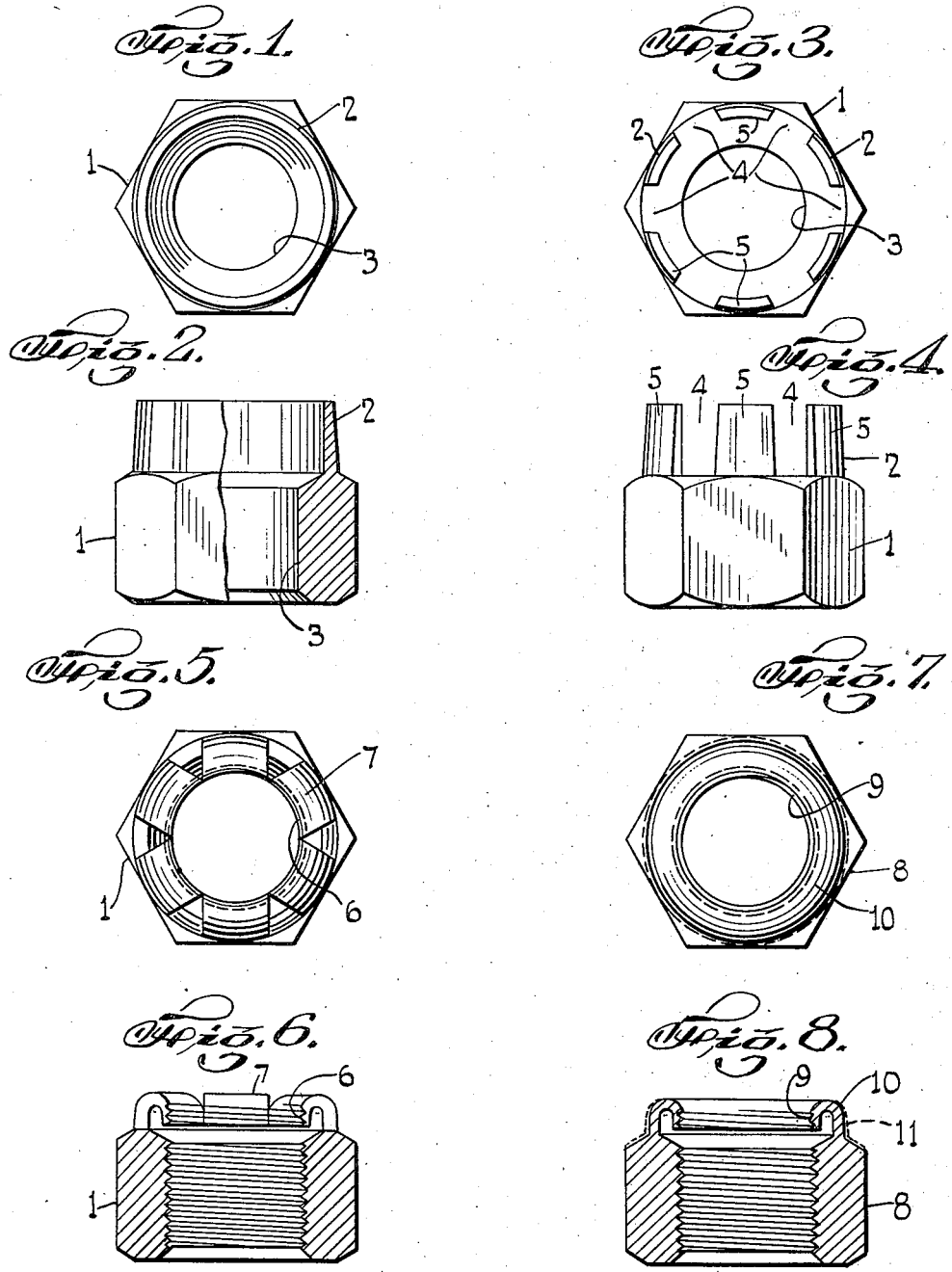

June 1, 1943.  R. W. LUCE  2,320,785
THREADED LOCKING DEVICE
Filed March 7, 1940  2 Sheets-Sheet 2

INVENTOR
Richard W. Luce
BY
George T. Gill
ATTORNEY

Patented June 1, 1943

2,320,785

UNITED STATES PATENT OFFICE 2,320,785

THREADED LOCKING DEVICE

Richard W. Luce, Southport, Conn.

Application March 7, 1940, Serial No. 322,650

5 Claims. (Cl. 151—21)

The invention herein disclosed relates to a threaded locking device of the type in which the locking effect is attained by setting up and maintaining a frictional contact between the surfaces of the engaging threads of two threaded elements.

In my U. S. Patent No. 2,196,637 of April 19, 1940, there is disclosed and described a threaded locking device of this kind. The particular device illustrated in that application is a lock-nut that includes a body portion having the load-carrying threads therein, another threaded portion spaced from and axially aligned with the body portion and an intermediate resilient portion uniting the two threaded portions. The resilient portion is in the form of a section of a bellows and it is arranged to partake of a bending action upon relative axial movement of the two threaded portions. The threaded portions are normally maintained with the threads thereof out of phase. The necessary relative axial movement of the threaded portions required to bring the threads thereof into engaging relation with a bolt entered therein expands the resilient portion which exerts a force that maintains the threads of the nut and the bolt in frictional contact. The resilient portion of such lock-nuts is formed by an internal recessing and external form-cutting operation. This internal recessing operation on nuts of the smaller size requires rather delicate tools and in consequence, a slower production rate in the production of the smaller sized nuts, particularly when the nuts are made of tough alloy steel.

An object of the present invention is to provide a threaded locking device of this kind together with a method for making such threaded locking devices that requires no internal recessing operation. Another object of the invention is to provide such a threaded locking device that is readily produced, even in the smaller sizes, in large quantities at comparatively high rates of production. A further object of the invention is to provide a threaded locking device of this kind that, even in the smaller sizes, may be produced on automatic machinery and comparatively inexpensively. A further object of the invention is to provide such a threaded locking device that is reliable in use.

The foregoing objects and certain advantages that will hereinafter appear are realized in accordance with the invention in the threaded locking devices, constituting certain specific examples of embodiments of the invention, that are illustrated in the drawings and the method for making these threaded locking devices that is disclosed below in connection with the following detailed description of the illustrated locking devices. The drawings include:

Fig. 1 which is a plan of a formed blank for a lock-nut embodying the invention;

Fig. 2 which is an elevation, partly in section, of the same;

Fig. 3 which is a plan of the blank after further fabrication;

Fig. 4 which is a side elevation of the same;

Fig. 5 which is a plan of a completed lock-nut;

Fig. 6 which is an axial section thereof;

Fig. 7 which is a longitudinal section of a modified form of lock-nut;

Fig. 8 which is a plan of the same;

Fig. 9 which is a plan of another modified form of the lock-nut; and

Figure 10:
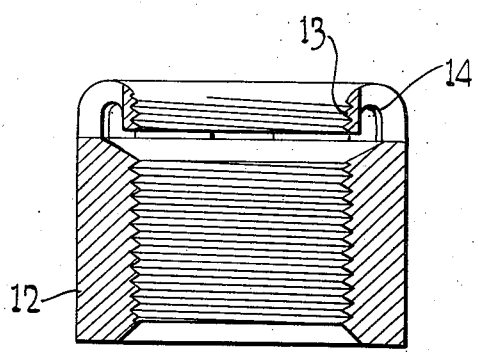

Fig. 10 which is a plan of the same.

The blank illustrated in Figs. 1 and 2 includes a hexagonal body portion 1 and a cylindrical extension 2 at one end of the body portion. The body portion is bored as at 3 and the cylindrical extension 2 is a wall section of considerably less thickness than the thickness at the body portion 1. The cylindrical portion extends from adjacent the outer edge of the body portion of the nut.

The same blank is illustrated in Figs. 3 and 4. After the blank of Fig. 1 has been machined, the wall section of the cylindrical portion 2 is notched as at 4. In the blank illustrated, the wall section 2 is notched at six places equally spaced angularly about the axis of the nut. This notching is accomplished during the construction of the nut by a punch which moves in radially of the axis of the nut and shears the metal along the edge of the notches in the manner of a punch press. The notching of the wall section 2 provides, in the illustrated blank, six strips 5 equally spaced through equal angles about the axis of the nut. These strips constitute the wall section of the extension 2 in the blank after the notching operation.

After the extension 2 has been notched, the strips 5 are rolled or peened over so that they are reversely bent as illustrated in Figs. 5 and 6. They are rolled inwardly and the notching is such that the outer edges of the strips are caused, when the strips are reversely bent, to form a substantially continuous portion 6 having substantially the same internal diameter as the body 1 of the nut. The bent portion 7 of the strips 2 form a wall section that constitutes a resilient portion uniting the body portion 1 of the nut and the portion 6 axially aligned with the body portion.

After the strips have been rolled over to the shape illustrated in Figs. 5 and 6, the nut is tapped. The tap is run through the body portion 1 and the axially aligned portion 6 formed by the wall section 2. Subsequent to the tapping operation, the nut is compressed to move the aligned threaded portion 6 towards the body portion and to position the aligned portion with the thread thereof out of phase with the thread of the body portion. This relation is illustrated in the nut in Fig. 6. The amount of metal in the wall section constituting the resilient portion 7 of the nut is such that the section 7 has a resiliency so that the two threaded portions may be moved relatively in an axial direction an amount greater than the ordinary commercial thread tolerances, without the resilient portion losing its ability to effectively exert a locking force. It is to be noted, that the relation of the several portions of the nut are such that upon relatively axial movement of the threaded portions the resilient portion partakes of a bending action.

When the nut is threaded on the bolt, the bolt first enters the body portion and then passes to the aligned threaded portion 6. The aligned threaded portion 6 is moved by the bolt axially, and relatively to the body portion 1, until the thread of the aligned portion 6 is brought into such position that the thread of the bolt may enter into engaging relation with the thread thereof. This movement effects a bending action in the wall section constituting the resilient portion which tends to return the aligned portion 6 to its normal out of phase position. This tendency of the resilient portion 7 causes the thread of the body of the nut to be drawn into surface engaging and frictional contact with the thread of the bolt entered therein. The forces so exerted by the resilient portion and the frictional engagement of the surfaces of the threads thus caused is sufficient to prevent rotation of the nut on the bolt under action of forces resulting from vibration and shock ordinarily encountered in service.

The nut illustrated in Figs. 7 and 8 likewise includes a body portion 8 having the load-carrying threads therein, an aligned tapped portion 9 and a resilient portion 10. In this nut, the rolled over wall section forming the resilient portion 10 and the aligned tapped portion 9 is continuous or unbroken. It is, however, reduced in thickness at the section forming the resilient portion.

In making this nut the cylindrical extension of a blank such as that illustrated in Figs. 1 and 2 is rolled over as indicated in Fig. 7. The wall of the extension is of a thickness sufficient to receive a thread and form a continuous threaded section. After the extension is rolled over the wall section of the resilient portion is of a thickness indicated by the broken line 11. An axial moving, form-cutting tool is utilized to reduce the wall section of the resilient portion by removing the portion between the broken line 11 and the solid line of the resilient portion 10. Next the nut is tapped, the tap being run through the body portion and the aligned portion 9. Then the nut is compressed axially to throw the thread of the aligned portion out of phase with the thread of the body portion. The thickness of the wall of the resilient portion 10 is reduced as above described an amount to provide the desirable resiliency.

In Figs. 9 and 10, a nut is illustrated in which the resilient portion is slotted after the cylindrical extension has been rolled over. This nut includes a body portion 12, an aligned tapped portion 13 and a resilient portion 14. The resilient portion consists of a series of strips 15 symmetrically disposed about the axis and extending between the body portion and the aligned tapped portion.

A blank such as that illustrated in Figs. 1 and 2 is utilized in making this nut. The cylindrical extension is rolled over to form the aligned portion 13. After the cylindrical extension is rolled over, a series of cutters are moved in radially, cutting a series of slots 16 and thus forming the strips 15 that make up the resilient portion. The nut is then tapped and compressed to throw the threads of the two tapped portions out of phase.

When a bolt is entered in the finished nut, it is threaded through the body portion and engages the aligned threaded portion. The bolt forces the aligned threaded portion away from the body of the nut until the thread thereof is brought into position to engage the thread of the bolt. The resilient portion, which is expanded, partaking of a bending action, endeavors to re-establish the normal out-of-phase relation of the two threaded portions and in so doing effects a force which causes the thread of the body portion to engage in frictional engagement with the thread of the bolt. It is to be noted that in each instance the thread engagement of the body portion of the nut with the thread of a bolt entered therein is in the same direction as that which would be effected by a force applied to the engaging face of the nut.

The several nuts illustrated in the drawings are of a kind that may be classified as "rolled over" nuts. In each of the constructions, there is formed a cylindrical extension on the end of the body of the nut. This extension which is of sufficient thickness to receive a thread is rolled over to form the resilient portion and the smaller tapped portion. The metal of the resilient portion is reduced in various ways to secure the desired resiliency.

From the foregoing description of the embodiments of the invention illustrated in the drawings, it will be seen that by this invention there is provided a threaded locking device and a method for making the same that are especially suitable for nuts of the smaller sizes. The threaded locking device of the invention is readily made in large quantities on automatic machinery in accordance with the method of the invention.

It will be obvious that various other modifications and changes in the details of the embodiments illustrated in the drawings may be made by those skilled in the art within the principle and scope of the invention as expressed in the appended claims.

I claim:

1. A threaded locking device comprising in combination a body portion having the load-carrying thread, a wall section extending from the body portion and reversely bent inwardly through an angle of approximately one hundred and eighty degrees to provide a substantially cylindrical end portion axially alined with and spaced from the body portion, the said end portion having a thread of like pitch as the thread of the body portion, and the reversely bent portion extending between the threaded portions and constituting a resilient portion normally maintaining the threaded portions axially out of phase toward each other and arranged to partake of a bending action upon relative axial movement of the threaded portions.

2. A threaded locking device comprising in combination a body portion having the load-carrying thread, a relatively thin wall section extending from the body portion and reversely bent inwardly through an angle of approximately one hundred and eighty degrees to provide a substantially unbroken cylindrical end portion axially alined with and spaced from the body portion, the said end portion having a thread of like pitch as the thread of the body portion, and the portion extending between the two threaded portions including a plurality of spaced strips symmetrically disposed about the axis of the device and constituting a resilient portion arranged to partake of a bending action upon relative axial movement of the threaded portions and normally maintaining the threaded portions with the threads thereof out of phase toward each other.

3. A threaded locking device comprising in combination a body portion having the load-carrying threads therein, a plurality of strips at one end of the body portion, substantially symmetrically disposed about the axis of the nut and reversely bent inwardly with the inturned edges abutting to provide a substantially cylindrical end portion axially alined with and spaced from the body portion, the said end portion having a thread of like pitch as the thread of the body portion, and the portions of the strips extending between the two threaded portions constituting a resilient portion arranged to normally maintain the two threaded portions axially displaced with the threads thereof out of phase toward each other and to partake of a bending action upon relative axial movement of the threaded portions.

4. A threaded locking device comprising in combination a body portion having the load-carrying thread therein, a relatively thin wall of separate sections extending from the body portion and reversely bent inwardly through an angle of approximately one hundred and eighty degrees to provide a substantially cylindrical end portion axially aligned with and spaced from the body portion, the said end portion having a thread of like pitch as the thread of the body portion, and the reversely bent portion extending between the threaded portions constituting a resilient portion normally maintaining the threaded portions axially out of phase toward each other and arranged to partake of a bending action upon relative axial movement of the threaded portions.

5. A threaded locking device comprising in combination a body portion having the load-carrying thread, a relatively thin wall section extending from one end of the body portion and inwardly bent to provide an end portion spaced from and axially aligned with the body portion, the wall of the end portion being sufficient to receive and maintain a thread and having a thread therein of like pitch as the thread of the body portion, and the bent portion uniting the two threaded portions constituting a resilient portion normally maintaining the threaded portions with the threads thereof out of phase toward each other and arranged to partake of a bending action upon relative axial movement of the threaded portions and so proportioned that it may bend under a force acting against the threads of the two threaded portions and without substantial damage to the threads, to an extent greater than the amount required to accommodate commercial thread tolerances.

RICHARD W. LUCE.